United States Patent [19]

Schwarz

[11] Patent Number: 4,973,954
[45] Date of Patent: Nov. 27, 1990

[54] NETWORK USER FOR MAINTAINING DATA AND ENERGY TRANSMISSION

[76] Inventor: Siegfried Schwarz, Oberer Panoramaweg 4, 7562 Gernsbach, Fed. Rep. of Germany

[21] Appl. No.: 301,013

[22] Filed: Jan. 24, 1989

Related U.S. Application Data

[63] Continuation-in-part of Ser. No. 97,174, Sep. 16, 1987, abandoned, which is a continuation-in-part of Ser. No. 758,389, Jul. 24, 1985, Pat. No. 4,760,571, which is a continuation-in-part of Ser. No. 649,372, Sep. 11, 1984, abandoned.

[30] Foreign Application Priority Data

Sep. 16, 1986 [DE] Fed. Rep. of Germany ....... 3631477
Feb. 23, 1987 [DE] Fed. Rep. of Germany ....... 3644868

[51] Int. Cl.$^5$ .................. G05B 23/02; H04M 11/04
[52] U.S. Cl. .................. 340/825.050; 340/310 R; 340/825.070
[58] Field of Search .......... 370/89, 85, 85.1, 85.2, 370/85.3, 85.4, 91; 340/310 R, 310 A, 825.06, 825.07, 825.14, 825.15, 825.52, 825.53, 825.54, 825.1, 825.16, 825.17

[56] References Cited

U.S. PATENT DOCUMENTS

| | | | |
|---|---|---|---|
| 3,696,383 | 10/1972 | Oishi et al. | 340/310 A X |
| 4,139,737 | 2/1979 | Shimada et al. | 340/310 A X |
| 4,173,754 | 11/1979 | Feiker | 340/310 R |
| 4,228,422 | 10/1980 | Perry | 340/310 A |
| 4,506,360 | 3/1985 | Kryskow, Jr. et al. | 370/89 |
| 4,535,401 | 8/1985 | Penn | 340/310 R X |

Primary Examiner—Ulysses Weldon
Attorney, Agent, or Firm—Dennison, Meserole, Pollack & Scheiner

[57] ABSTRACT

The transmission of data and energy takes place by separate or the same lines, and the users of the network do not themselves supply any energy into the network. For transmission, the users successively modulate the supplied energy. The energy consumption of the users is minimized through the data transmission procedure, in which the users are successively set into operating state and after completion of the required action automatically return into the "ready for operation" state with lower energy consumption.

15 Claims, 2 Drawing Sheets

NETWORK USER FOR MAINTAINING DATA AND ENERGY TRANSMISSION

This is a continuation-in-part of application Ser. No. 97,174, filed Sept. 16, 1987, now abandoned, which is a continuation in-part of application Ser. No. 758,389, filed July 24, 1985 now U.S. Pat. No. 4,760,571, and this which is a continuation-in-part of application Ser. No. 649,372, filed Sept. 11, 1984, now abandoned.

BACKGROUND OF THE INVENTION

The invention relates to network users which transmit data and energy via separate or over the same lines, whereby the data and the energy of each network user is maintained.

In such networks, data and energy from distant sensors, actuators, apparatus and computers are exchanged and supplied to network users via the network.

The network transmits the data via 4 to 20 mA-interfaces using an analog manner or transmits data digitally via the serial interfaces RS 232, V 24. In both cases, energy is frequently transmitted to the remote apparatus with additional lines. A user in the network will immediately reply to a request from a second user by transmitting data.

It is known, to transmit data and energy of sensors in areas protected against explosion according to NAMUR, via the same lines. In all cases, the data are only transmitted between two points. The network users which are for measuring, controlling and regulating use network drivers during transmission to supply energy into the network. In my German Offenlegungsschriften Nos. 33 33 847 and 33 13 240 and in my U.S. Pat. application Ser. No. 649,372 filed on Sept. 11, 1984, I have disclosed a local network operating according to the RSMA/CD method which needs to be coupled to the network only as an additional IC-unit. An example of such a network is set forth in my German Offenlegungsschriften No. 34 27 350 and in my U.S. Pat. application Ser. No. 758,389 filed on July 24, 1985 and now U.S. Pat. No. 4,760,571. In these networks, the network drivers supply the energy to the network, and they are less suitable for the transmission of data and energy, because they require a high degree of energy for transmission. Accordingly, a separate network controller and/or a processor is always required for data transmission.

Consequently, the coupling of users which are usually easily controllable becomes unnecessarily time consuming and costly. In addition, there are not any elements which permit the minimization of energy in the network or in the network users and the allocation of different energies throughout the network.

SUMMARY OF THE INVENTION

It is the object of the present invention to facilitate considerably the data transmission via a network to slave-users which are easily controllable.

The problem is solved, according to the invention, in that at least one central supply apparatus supplies the users of the network and their network drivers with energy. All users of the network, within the scope of their access authorization, successively modulate this energy for data transmission, without themselves supplying energy into the network.

The network users can operate without a processor when their task only consists of carrying out preprogrammed commands, which are requests of a master. In addition to this, the network driver which couples the user to the network is, itself, equipped with control units which initiate and carry out commands, requests and then redirect the requested data.

In order to minimize the energy of the network, the users can differentiate three states, to reduce the energy taken up by them, namely in operation, ready for operation and out of operation with storage of the operation data. The received energy from the users is modulated for a data transmission and distributed to all users.

Accordingly, the separate network controller and/or processor is eliminated and the network driver which couples the users to the network controls and/or questions the request and/or command units itself and subsequently redirects the requested reply. This means that with such users the necessary control and storage functions are taken over by the network driver.

An advantage is that the additional functions of each user are facilitated when the user adds its reply to the request or the command of a second user by taking over its access priority to the network.

The remarkable advantage lies in that even computers used in areas having a risk of explosion are able to operate without their own voltage supply. In these endangered areas, network or supply apparatus can be dispensed with, because the supply takes place via the network of the networked computers.

The advantage achieved by the invention lies with a single BUS, ring or tree network having a plurality of users which can be connected and thereby not only is the transmission of data between them made possible, but also the supply of energy of the apparatus can take place (via this network). Advantageously, the supply of energy takes place in the center of the network.

The possibility of data transmission in the network is further improved in that the network driver can contain a transmission collision detector to support a CSMA/CD access.

The flexibility of the data and energy transmission via the network is increased in that the network driver contains a device, and undertakes an automatic switch-over of access as a function of the network load only if the destination address is equal to the user address.

Preferably, the devices which control the users have interface circuits, which are known in the art as UART or respectively USART. These interface circuits are then coupled via the network driver with the network.

In a preferred embodiment of the network according to the invention, the device which controls the users may be a software driven CMOS-single chip computer preferably of the type INTEL (RTM) 8051 with a serial interface UART. The devices which control the users may also be a computerless hardware in both cases all the devices to realize a network user may be on the same monolithic customer strip.

In such a network, one and the same protocol can be used for data and energy transmission or only for data transmission, whereby only levels 1 of the ISO model are adapted for the transmission of data and energy of the other network drivers.

The energy of the network will be economized if the users work after the start stop principle. Each user starts with the valid user address then switches to "in operation" and stops after the performance of its tasks with the switch to "ready for operation."

Further characteristics and advantages of the user according to the invention and its coupling to the network can be seen from the following description of the embodiments by means of the drawings.

DESCRIPTION OF A PREFERRED EMBODIMENT

Figure 1A:
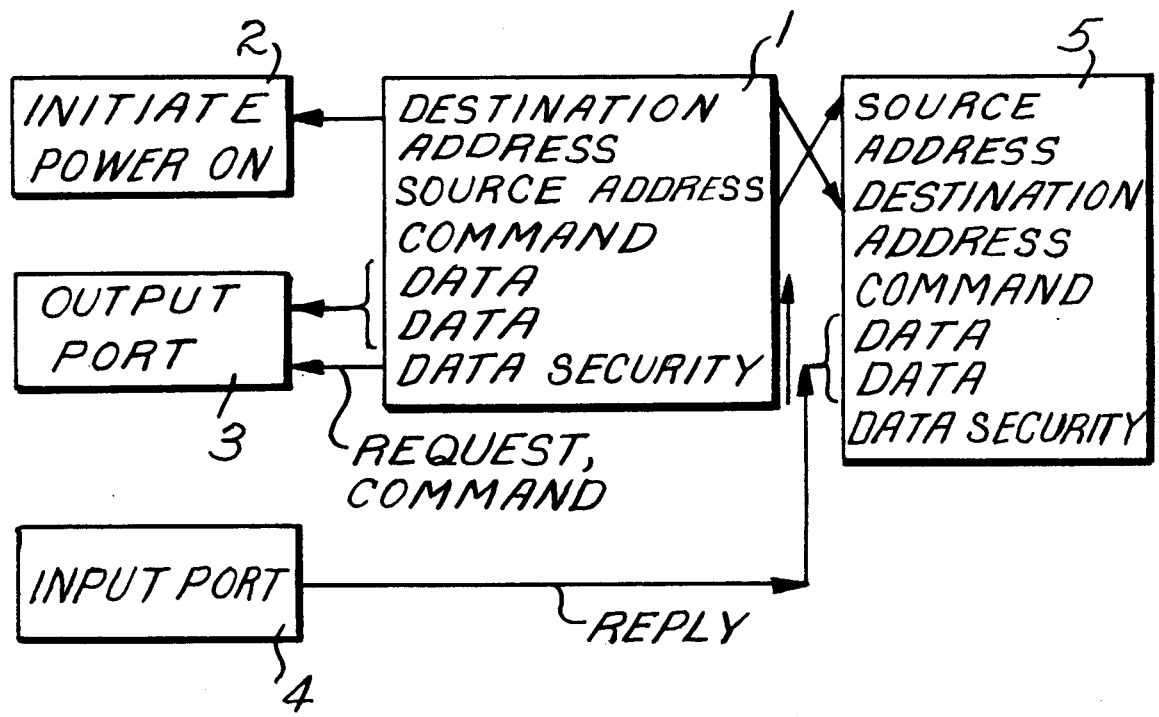
FIGS. 1A and 1B are a logical list of instructions for the device which controls the user.
Figure 1B:
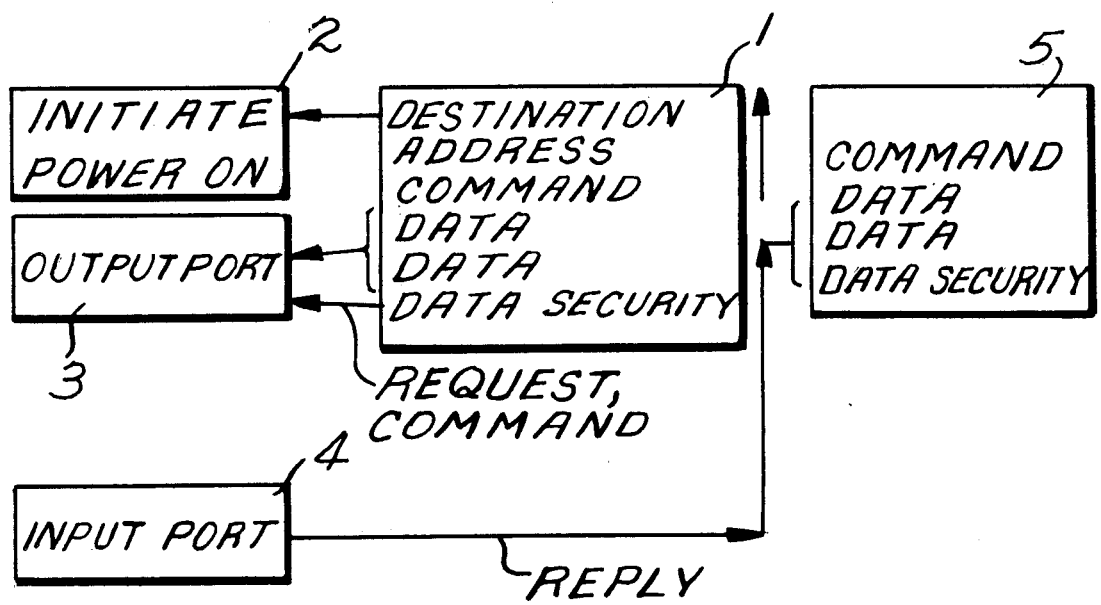
Figure 2:
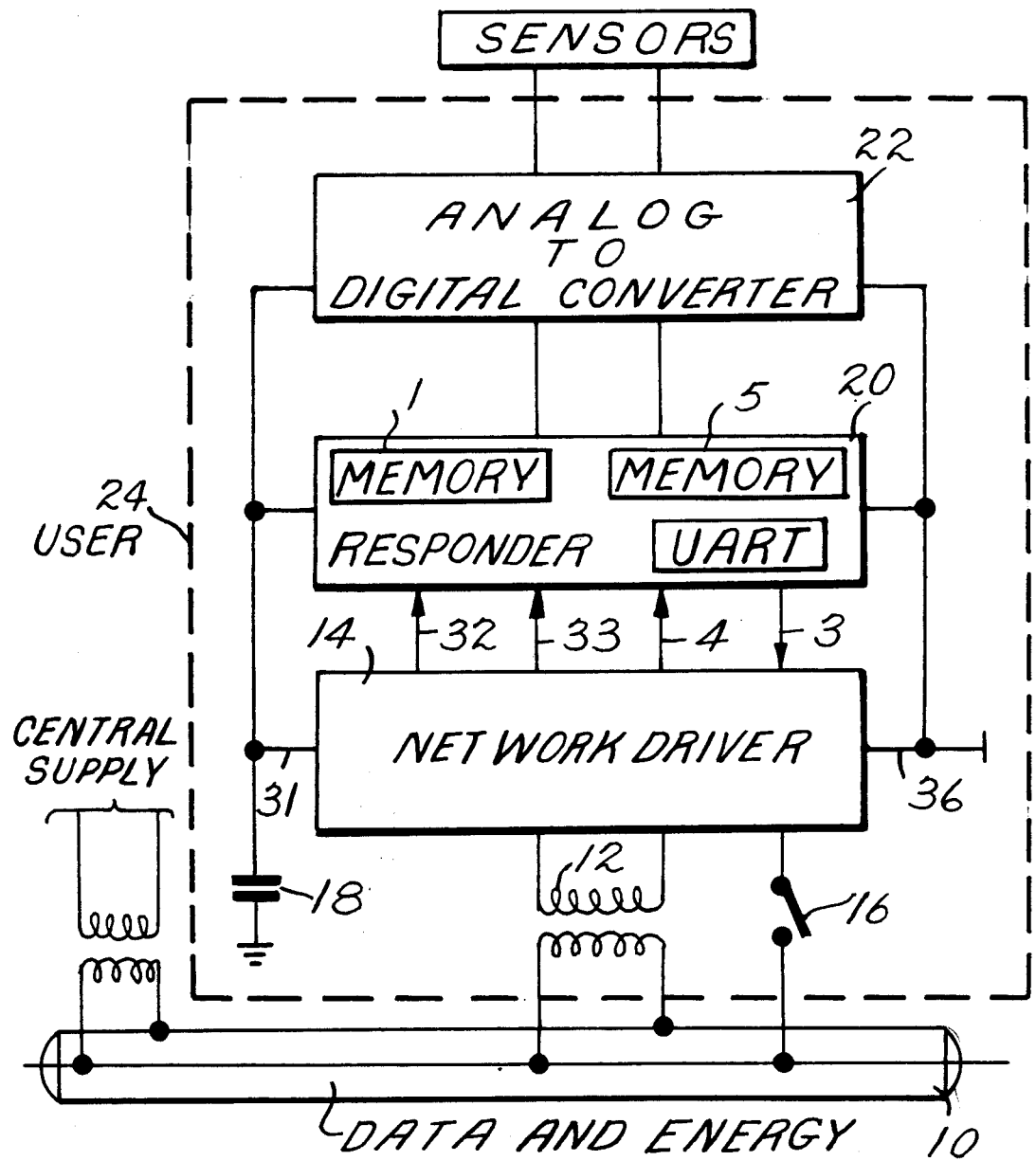
FIG. 2 is one embodiment of network users according to the invention.

FIGS. 1A and 1B are a logical list of instructions for a device 20, which controls a network user 24, as shown in FIG. 2. The network user 24 can be realized with or without a computer and it is tailored to simplify the computerless version with a responder 20. As previously stated, responder 20, which controls the user, may be a software driven CMOS-single chip computer, preferably of the type INTEL (RTM) 8051 with a serial interface UART. To get an instruction, the received message frame of a request command is in storage 1, and the transmitted message frame of the reply is in storage 5.

These frames as in FIG. 1A of the request, of the storage 1 and the reply, storage 5 are identical and thus symmetrical. In principle the frames, as shown in FIG. 1B, can also be asymmetrical. In this case, the requesting master will wait for a reply from the slave.

In the known networks, the data from and to the users immediately passes the network driver 14. U.S. Pat. No. 4,760,571 is hereby incorporated by reference. Particularly, reference is made to the incorporation of column 3, line 58 through column 4, line 38 and FIG. 1 for a description of the network driver. In order to be able to have a computerless user 24 as a simple hardware responder, the responder 20 has to take over various tasks together with the network driver 14. These tasks are shown in FIG. 1.

The tasks are performed in the following order:

1. Storage of the destination address in the memory 1 and the comparison with its individual address. If the destination address is equal, the responder 20 initiates "power on" of the whole user 24.

2. Storage of the received source address, command, data in the memory 1, which follows the valid destination address.

3. If the data security is correct, the data will be given to the output port 3.

4. If the received command in the memory 1 demands a reply, the responder 20 appends to the received message or sends its own transmitting message 5. This message 5 consists successively of the source address, destination address, a command, the data from the input port 4 and the data security.

5. The responder 20 calculates the message in the memory 5 together with the valid data security. The responder 20 gets the command and transmits a reply to the first user with the received command of the request in memory 1.

The before mentioned tasks of the responder 20 do not depend on the access method used in the network. The network access may take place according to the master-slave principle, the CSMA/CD or the token passing method. Examples of such access are set forth in my German Offenlegungsschriften Nos. 33 13 240 and 33 33 847 and in my U.S. Pat. application Ser. No. 649,372 filed on Sept. 11, 1984. I have disclosed a local network operating according to the token passing method in German Offenlegungsschriften No. 34 27 350 as well as in U.S. Pat. application Ser. No. 758,389 filed on July 24, 1985 now U.S. Pat. No. 4,760,571 which is hereinafter incorporated by reference. Each of these access methods have an underlaid master/slave access for the user 24.

The described users are slaves and their access to the network is established by a request or a command by a second user which is always a master. But the users 24 may, however, establish the network access itself and transmit the reply without a request.

As an example, a sensor is named here which is normally a slave yet establishes network access itself when its admissable limit values are exceeded.

6. When the token passing method is used, the network driver can accomplish a further task such as retransmission of the token to the requesting and commanding second user on completion of the reply.

FIG. 2 shows user 24 which can be with or without computer having a connection to a network through transmission lines which can be connected to a plurality of users such as user 24. The figure shows the user 24: a transformer 12, a network driver 14, an individual address switch 16, an energy storage unit 18, the responder 20 and the analog to digital converter 22. The sensor element is external to the user 24.

The transmission of data and energy takes place via the network lines 10, the transformer 12 and the network driver 14; thereby the network lines 10 are supplied centrally by at least one source alternating-current voltage. On transmission of a user 24, the energy is modulated, for example the amplitude of the alternating-current voltage in the NRZ code.

From the alternating-current voltage at least one regulated direct-current voltage is produced, the maximum current of which is limited such that the short-circuit of one or more users of the network does not endanger the data transmission of the remaining users of the network. The network driver 14 supplies the user 24 with at least one stabilized direct-current voltage 31,36. Thereby a condenser 18 and/or an accumulator serve as energy storage for this direct-current voltage. Unit 18 is conceived solely as an energy storage unit, e.g. an accumulator or a condenser. In case of a network failure, this energy is necessary to be able to preserve the data in the network user's memory. Unit 18 is not intended to store data itself, rather it would only supply energy to preserve data already stored in the network user's storage units. Unit 18 stores energy with which the network user's storage unit will be supplied, so that it can save its parameters even during a network failure, which can lead to a power failure.

The maximum current to each user 24 is limited in the network driver 14 so that in the case of a short-circuit of one or more users 24, the transmission of data and energy to the other users throughout the network is not disturbed.

The network driver 14 only passes on to its user 24 the data which are intended for the latter. For this, the network driver 14 contains the address switch 16. If the destination address of a message coincides with the address of a user 24, then this user 24 is transferred from the "ready for operation" state into the "in operation" state. This takes place through the address-interrupt command, e.g. via line 32. The responder 20 performs the required operation, and thereafter automatically switches back into the "ready for operation" state, with reduced energy consumption. The control of the analog to digital converter 22 is effected through the responder 20, in parallel or in series. An external sensor may monitor a random magnitude, which is applied to the responder 20 as a signal via the analog to digital converter 22.

If the network breaks down, the operational parameters of the responder 20 are saved and powered through the stored energy in the energy storage unit, namely the accumulator 18. In order that this energy is sufficient for a long period of time, the responder 20 is switched by the network driver 14 with the command "power down", for instance on line 33, into the "out of operation" stage, until a new address is transmitted. In the "out of operation" state, the responder 20 takes up the least possible energy.

The data transmission between the network driver 14 and the responder 20 may take place in series or in parallel. In the simplest case, the data in the figure are transmitted in series as transmission data, e.g. via line 3 and as receiving data e.g. via line 4.

In the case of the network user 24 without computer, the external sensor is connected directly with the responder 20 via the analog to digital converter 22. The user 24 in the network replies to a second requesting and/or commanding user via the responder 20. Acting as a slave, the responder 20 controls the request and/or command units and redirects the requested reply, without being commanded by a computer. The user 24 as a slave adds its reply to the request or the command of a second, calling user by taking over its access priority to the network. At this point, the network driver 14 stores the destination address which is called and compares it with the user address. The responder 20 stores the incoming data on receipt of a valid destination address and initiates the request or the command to be carried out. Whereupon, if the data security is valid, the responder 20 carries out the command. The responder 20 then transmits the reply either by first storing the source address and then the destination address, thereby taking over the access priority of the requesting, commanding user, or the responder 20 starts transmission of the reply without address. The responder 20 then appends to the received request, its transmitted reply. The responder 20 forms data-security from the transmitted reply and appends it to the reply as a termination.

In the token passing method as network access, the responder 20 returns the access priority, the token, to the requesting, commanding second user after its reply.

The user 24 comprises all components required in order to be able to receive the request and/or command of the second user, to carry out the command, to form the request data and to redirect the request data as a reply to the second user.

The user can function as a sensor and/or actuator.

A network can be formed having a plurality of network users for controlling, measuring and regulating the transmission of data and energy over separate or the same supply and return lines. In such a network, there is one central supply for supplying the users of the network with energy. Each user only accesses the energy line with authorization and can modulate the current energy to a predetermined level.

The supply of energy to the users is with alternating current voltage. Because the supply is alternating current voltage, each user is galvanically separated from the network by a transformer. The alternating current voltage has a half-wave cycle which serves to supply the users and serves for synchronization of the data. From this alternating current-voltage, a regulated direct-current voltage is produced by the transformer. The maximum current to the user is limited so that the short-circuit of one or more users in the network does not endanger the data transmission of the remaining users of the network.

Each of the master users is a controller and contains a programmable software driven CMOS-single chip computer, preferably of the type INTEL (RTM) 8051 with a serial interface UART. These master users operate similarly to the network set forth in my U.S. Pat. No. 4,760,571, which is incorporated by reference.

The master user or commanding user sends a commands or requests to one of the hardware responders which act as slave users in the network. The slave responder will be in its first stage of three stages to reduce energy consumption. The three stages are: "In operation," "Ready for operation," and "Out of operation" on storage of the operation data. The energy consumed by a user is controlled through the data transmission and the energy is distributed to all users.

As previously discussed, each of the hardware responders shares control of the user with its network driver and the network driver contains a transmission-collision detector for controlling the access to the network. The network driver undertakes address recognition and also passes data on to its user. After the required operations are performed, the responder transmits a reply to the requesting master by the source address stored and then the destination address, thereby taking over the access priority of the requesting, commanding master. Alternatively, the responder can start transmission of the reply without an address and instead appends to the received request command its own transmitting reply. If this type of transmission is performed, the responder will form a suitable type of data-security from the transmitted reply by appending the data-security to the reply as a termination.

The present disclosure relates to subject matter contained in German Pat. application Nos. 36 31 477.3 (filed Sept. 16, 1986) and 36 44 868.0 (filed Feb. 23, 1987) which are incorporated herein by reference.

It will be understood that the above description of the present invention is susceptible to various modifications, changes and adaptations, and the same are intended to be comprehended within the meaning and range of equivalents of the appended claims.

What is claimed is:

1. A local area network, comprising:
   means for transmitting data and energy throughout the local area network;
   means for supplying energy to said transmitting means at a predetermined level from a central location on the local area network, wherein the energy is alternating-current voltage with a half-wave cycle for synchronizing data;
   at least one network user connected to said transmitting means for sending data containing destination addresses throughout the network and for receiving data only if the destination address identifies said network user, so when the data is for said network user identified by the destination address, said network user also receives the energy with the alternating-current voltage, otherwise said network user being connected to said transmitting means merely modulates the energy on said transmitting means to the predetermined level of the local area network, wherein on failure of said energy supply means said user is converted by a network driver, into the "out of operation" state with low energy consumption, and the operation energy is maintained by an accumulator is said user, until said network driver converts the user back into the "ready for operation" state after receipt of a destination address, and said user coupled with UART, USART through said network driver to the network.

2. A network according to claim 1 wherein said user are separated with said transforming means galvanically from the network.

3. A network according to claim 1, wherein said user differentiate three stages to reduce their consumed energy, said stages being "in operation", "ready for operation" and "out of operation" on storage, of the operation data, and the energy consumed by said user is controlled throughout the data transmission and so the energy is distributed.

4. A network according to claim 3, wherein each network driver to reduce the energy of its user checks, acting for its user, whether the destination address of a message is valid for its user and only then converts its user from "ready for operation" state into the "in operation" state, when the destination address coincides with the address of the user, whereby the user takes over the message, performs the required operation and after its completion automatically returns into the "ready for operation" state with a lower energy consumption.

5. A network according to claim 1, wherein said user contain a CMOS-single chip computer with a serial UART.

6. A network according to claim 1 wherein for data and energy transmission or only for data transmission one and the same protocol is used.

7. A network according to claim 1 wherein the network driver having a responder not only undertakes the address recognition and passes the data on to its user, but also transmits data.

8. A local area network according to claim 1, wherein said network user includes means for transferring the energy with the alternating-current voltage from said transmitting means to said network user by magnetic induction and for transferring enough energy from said network user to said transmitting means so the energy on said transmitting means remains at the predetermined level.

9. A local are network according to claim 8, wherein said network user includes
a network driver connected to said transferring means, said network driver having means for storing a particular address of said network user, an address switch connected to said transmitting means for allowing the data containing the destination address to enter said network driver from said transmitting means, and means for identifying the destination address as the address of said network user by comparing the destination address with the stored address.

10. A local area network according to claim 9, wherein said network user includes:
an analogue to digital converter for converting received analogue data to digital data;
means for transforming the received energy with alternating-current voltage to direct-current voltage so when said network user short-circuits, said network can still transmit data to and receive data; and
means for storing energy in case of a network failure, said energy storage means receiving and accumulating energy from said network driver, such as extra energy received because the energy on said transmitting means is at the predetermined level, so when a network failure occurs, said stored energy can preserve data in said network user.

11. A local area network according to claim 10, wherein some of said plurality of network users include a computer and act as a master network user while others of said plurality of network users include a computerless responder and act as a slave network user.

12. A network user for maintaining data and energy transmission on a local area network, comprising:
means for transferring energy with alternating-current voltage from the local area network to said network user;
a network driver connected to said transferring means, said network driver including
means for storing a source address which is unique to said network user and identifies said network user as particular network user on the local area network,
an address switch for switching said network user from a reduced energy consumption state such as "ready for operation" to an energy consumption state such as "in operation",
means for identifying a destination address from the local area network as the address for said particular network user by comparing the destination address with the unique stored source address, so when the compared addresses match said network driver through said address switch power-ups said network user; and
a responder for transmitting a reply either by the source address stored and then the destination address, thereby taking over the access priority of the requesting, network user, or said responder starts transmission of the reply without said source address and appends to the received request command its transmitting reply with said responder forming a data-security from the transmitted reply and appending it to the reply as a termination.

13. A network user according to claim 12, including:
an analogue to digital converter;
means for transforming the transferred energy with alternating-current voltage to direct-current voltage; and
means for storing energy, in case of a network failure in the local area network, by receiving and accumulating energy from said transferring means so when the network failure occurs data stored in said network user is preserved.

14. A network user according to claim 13, including:
responder means connected to said network driver for controlling said network user during the "in operation state" by receiving a signal from said network driver to power-up and for receiving any data received with the destination address, said responder means including means for storing data, means for performing any required operation, and means for powering-down so when said responder has responded to the received data, said responder automatically switches to the "ready for operation" state with reduced energy consumption.

15. A network user according to claim 12, wherein said user establishes a network access according to a central master principle, the CSMA/CD method or the token passing method, wherein with the driving token passing method as said network access, the responder can return the access priority to the requesting, commanding user after its reply.

* * * * *

UNITED STATES PATENT AND TRADEMARK OFFICE
CERTIFICATE OF CORRECTION

PATENT NO. : 4,973,954

DATED : November 27, 1990

INVENTOR(S) : Siegfried Schwarz

It is certified that error appears in the above-identified patent and that said Letters Patent is hereby corrected as shown below:

Column 1, line 9, delete "which".

Column 1, line 37, change "RSMA/CD" to --CSMA/CD--.

Column 7, line 4, change "is" to --in--.

Signed and Sealed this

Seventh Day of April, 1992

Attest:

HARRY F. MANBECK, JR.

*Attesting Officer*   *Commissioner of Patents and Trademarks*